United States Patent [19]
Klaas

[11] Patent Number: 6,149,198
[45] Date of Patent: *Nov. 21, 2000

[54] SUSPENSION ARM ARRANGEMENT

[76] Inventor: Friedrich Klaas, Achalmstrasse 24, D-73432 Aalen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/930,912

[22] PCT Filed: Apr. 15, 1996

[86] PCT No.: PCT/DE96/00657

§ 371 Date: Apr. 22, 1998

§ 102(e) Date: Apr. 22, 1998

[87] PCT Pub. No.: WO96/32312

PCT Pub. Date: Oct. 17, 1996

[30] Foreign Application Priority Data

Apr. 14, 1995 [DE] Germany ............ 295 06 170 U

[51] Int. Cl.[7] .............. B60G 13/00; B60G 3/12; B62D 21/03
[52] U.S. Cl. ............. 280/798; 280/794; 280/124.108; 280/124.128; 280/124.134
[58] Field of Search ........... 280/124.128, 124.108, 280/124.132, 124.134, 798, 794, 796; 180/905; 29/897.2

[56] References Cited

U.S. PATENT DOCUMENTS

| 2,746,763 | 5/1956 | Nallinger | 280/796 |
| 3,000,650 | 9/1961 | Burrows | 280/793 |
| 4,232,881 | 11/1980 | Kolbel et al. | 280/124.128 |
| 4,700,796 | 10/1987 | Morlok et al. | 180/348 |
| 4,830,396 | 5/1989 | Gandiglio | 280/124.109 |
| 5,042,837 | 8/1991 | Kleinschmitt et al. | 280/784 |
| 5,641,176 | 6/1997 | Alatalo | 280/124.13 |
| 5,839,776 | 11/1998 | Clausen et al. | 296/188 |

FOREIGN PATENT DOCUMENTS

| 393 397 | 10/1990 | European Pat. Off. . | |
| 60-76409 | 4/1985 | Japan | 280/124 |
| 96 19373 | 6/1996 | WIPO . | |

*Primary Examiner*—Brian L. Johnson
*Assistant Examiner*—Matthew Luby
*Attorney, Agent, or Firm*—Pillsbury Madison & Sutro, LLP.

[57] ABSTRACT

The invention is directed to a suspension arm that is constructed and arranged to elastically absorb transverse and longitudinal forces transferred from the wheels of a vehicle to the supporting structure. The supporting structure comprises two hollow rear axle supports, each formed by a high interior pressure metal forming process. The rear axle supports each have a variable cross-sectional shape and are connected to one another. Fastening devices are attached at opposite ends of each of the two hollow rear axle supports and are adapted for fastening the support structure to a vehicle.

9 Claims, 3 Drawing Sheets

SUSPENSION ARM ARRANGEMENT

This appilication is the national phase of international application PCT/DE96/00657, filed Apr. 15, 1996 which designated the U.S.

The subject of the invention is a suspension arm comprised of hollow machined parts for fastening wheels to vehicles.

Above all, the subject of the invention is suspension arms that employ hollow pipe sections in the process of high interior pressure metal forming for shaping machined parts for axle supports, whereby in this case pipe sections are any stretched out, ductile hollow pieces, including shaped rectangular pipes, hexagon pipes or other hollow profiles that are used as starting materials in a high interior pressure metal forming process. Pipes can be extruded as well as straight bead welded pipes.

A suspension arm in this case is a so-called "floating steering axle" that, by means of a framework, intercepts the different loads that the wheels transfer to the axles and thus the vehicle, partially cushioning and absorbing them in a ductile manner. Usually this elasticity is obtained by means of a supporting framework that has two parallel longitudinal mounts which in essence are parallel to the longitudinal axis of the vehicle, with the longitudinal mounts each having a loop at their respective two extreme ends that allow them to be attached to the body of the vehicle and that are connected by means of two transverse parts. The longitudinal mounts have receptacles—usually bores—so that wheel mounts can be attached in a ductile manner with the wheel mounts often being lined with elastic material in order to make an elastic bedding of the wheel mount components possible.

Compared to the rigid axles that were usually used in the past, these floating steering axles have a much higher degree of torsion ability; the vehicle is less likely to swerve in curves and therefore has a completely different cornering ability, especially at high speeds.

The suspension arms used up until now were mainly comprised of solid parts—i.e. solid transverse and longitudinal mounts.

These parts are heavy and the torsion ability of their individual components has room for improvement. The assembly of the individual components was a comprehensive process since a considerable number of screw processes were required that had to be carried out with a high degree of precision.

Therefore the invention is charged with providing an improved suspension arm that is easier to assemble and manufacture.

The means for attaining the object of the invention are a suspension arm with hollow machined parts for fastening the wheels to a vehicle by means of a supporting structure for the elastic absorption of transverse and longitudinal forces that are transferred from the wheels to the machined parts together with two hollow rear axle supports that are formed by means of the high interior pressure metal forming process (IHP process), and that possibly have cross sections that can be modified (D—D, C—C, A—A, B—B), with the rear support axles having fastening devices for fastening the suspension arm to the vehicle whereby the hollow rear support axles that are formed by means of the IHP process are connected.

Advantageous advancements are indicated in the subclaims.

Compared to solid suspension arms and compared to the customary suspension arms that use deep-drawn pieces made of steel, the so-called hollow floating steering axles, as shown schematically in the figures, offer a weight advantage of up to 50%. The fact that, in accordance with the invention, pipes are used that have favorable elastic and deformation properties such as return behavior and torsion bracing, it is possible to use lighter materials, for example aluminum, as well as relatively thin-walled metal pipes that were formed into mechanically/statically favorable shapes by means of the IHP process.

In this application the high interior pressure process or IHP process is the process that is described in Industrieanzeiger [industrial publication] No. 20 dated Mar. 9, 1984 and in "Metallumformtechnik" [metal forming technique], issue 1D/91, page 15 and subsequent pages: A. Ebbinghaus: "Präzisionswerkstücke in Leichtbauweise, hergestellt durch Innenhochdruckumformen" [precision work pieces in light construction, manufactured by high pressure forming] and in Werkstoff und Betrieb [material and plant] 123 (1990), 3, pages 241 through 243: A. Ebbinghaus: "Wirtschaftliches Konstruieren mit innenhochdruckgeformten Präzisionswerkstücken" [economic engineering with high pressure formed precision work pieces] or "Werkstoff und Betrieb" 122, (1991), 11, (1989), pages 933 through 938. In order to avoid repetition, these disclosures are incorporated comprehensively by reference.

Up until now this process was used for manufacturing flanges, for example, as described in EP-2395052 whereby it already is customary knowledge to produce forces in the longitudinal axis of the hollow part during the forming operation; these forces cause a material accumulation that ensures that the wall thickness of the hollow parts can be maintained at a constant level during the forming process.

Preferred are hollow parts (14, 10) that, at least in part, are comprised of a cold forming, heat treatable metal or metal alloy or plastic material and that have a fiber orientation that is parallel with regard to the outside contour of the hollow parts (14, 10).

Material that is at least partially comprised of carbon containing steel and/or at least partially of an aluminum alloy and/or a fiber reinforced material such as fiber reinforced plastic material or metal is preferred. Axle steel such as St 52 or an aluminum alloy such as a self-hardening alloy on the basis of AlMgMn such as $AlMg_5Mn$ or a precipitation hardening alloy such as $AlMgSi_1$ are preffered. It may be practical to ensure that the material has a sufficient ability to expand for the hardening process but also is heat-treatable.

Typical wall thicknesses of IHP formed hollow parts—depending on the materials—are approximately 2–3 mm, preferably less than approximately 2.5 mm. This results in a considerable weight reduction.

It also is possible to form layer materials, i.e. materials that have different layers of material to prevent corrosion or to absorb vibrations.

According to the invention, the hollow machined parts can have at least partially molded profiles such as longitudinal and/or transverse ribs that provide an additional degree of bracing or reinforcement for the hollow parts, depending on what the requirements are.

In accordance with the invention, the customary high interior pressure metal forming process (ref. conference publication of the 14th Metal Forming Colloquium in Hanover in 1993, the disclosure of which is fully incorporated by reference) is used for manufacturing major components of the suspension arm in accordance with the invention. The superior accuracy of form of this forming process that provides an actual flow of materials without material resilience that usually is part of the bending processes results in an advantageously high degree of precession from a technical point of view that characterizes hollow parts that were manufactured by means of the high interior pressure metal forming process.

In the following paragraphs the invention is described in more detail with the help of the attached drawing and its subsequent description.

A suspension arm in accordance with the invention is characterized in that it—compared to the customary suspension arms—does not have any solid profiles but instead is comprised of hollow parts that are connected and form a supporting structure. The longitudinal mounts that are bent and extend three-dimensionally into the area have fastening devices 12 or similar devices at both of their ends for fastening the arrangement to the vehicle and that can be molded or subsequently welded on, while the hollow transverse mounts 14 are welded on, for example, to the longitudinal mounts 10, or, preferably, are fastened to the forming 16 on the longitudinal mounts.

The use of the IHP process allows for an exceptionally favorable fiber orientation that is parallel to the exterior contours of the hollow parts and that results in a high degree of stability of the hollow parts and thus, together with a thin wall thickness, provides for a high degree of stability and a low weight. This means that in practical applications it is possible to bend the parts in precisely stipulated areas of the suspension arm without weakening the material.

There is no possible separation of the rear axle hollow parts. It is important to use material that has a sufficient degree of cold forming capacity but simultaneously has a sufficient degree of elasticity in order to provide a supporting structure that absorbs forces.

This material, for example, can be a suitable carbon containing steel that can be heat treated but has a sufficient degree of expansion ability in order to be able to tolerate such a forming process without tearing. Of course it is possible to use different light and/or solid materials, depending on the intended use of the axle arrangement in vehicles, such as aluminum alloys, titanium alloys and other materials that are used and that are familiar to those skilled in the art. Depending on the intended use, it is possible to use an expensive, light material or even a heavy material, provided weight does not present a major component in the intended use.

Typical materials are $AlMg_5Mn$ or a precipitation hardening alloy such as $AlMgSi_1$.

It also is possible to use axle steel such as St 52.

Figure 1:
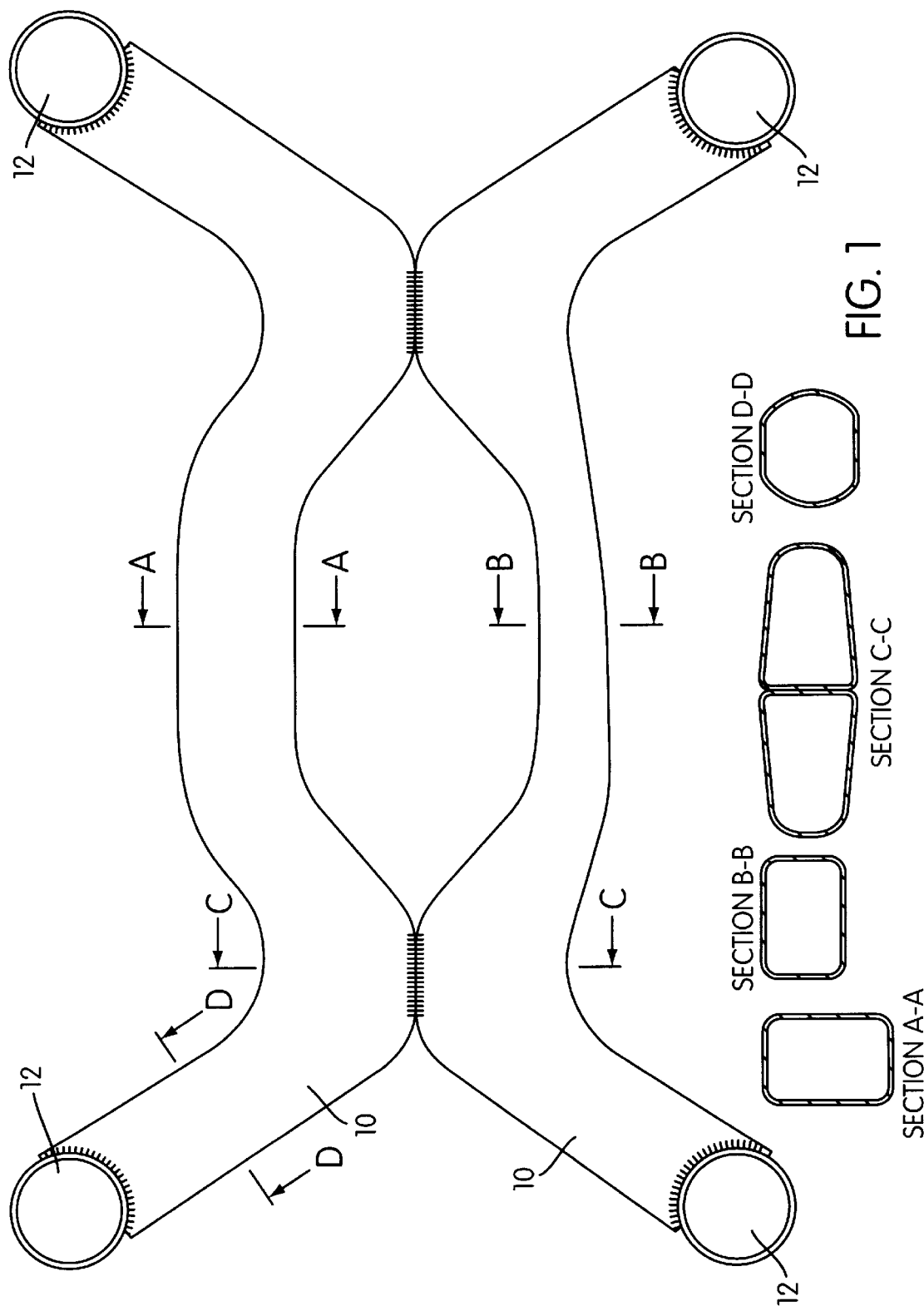
FIG. 1 shows a schematic view of a suspension arm in accordance with the invention that is comprised of 2 hollow parts; as well as cross sections of the individual areas of the hollow parts.

FIG. 1 shows a possible embodiment of a suspension arm in accordance with the invention that essentially is comprised of two wave or even W-shaped IHP formed hollow parts that are arranged opposite each other in a manner that ensures that they make contact at the point of their respective wave troughs. At their points of contact they are connected by means of customary measures such as welding, gluing, etc. as are familiar to those skilled in the art of the respective material and purpose of application.

The cross sections A—A, B—B, C—C and D—D of FIG. 1 that are sketched below the suspension arm clearly show that the hollow parts have different cross sections across their longitudinal expansion that are optimized with regard to their respective load.

Figure 2:
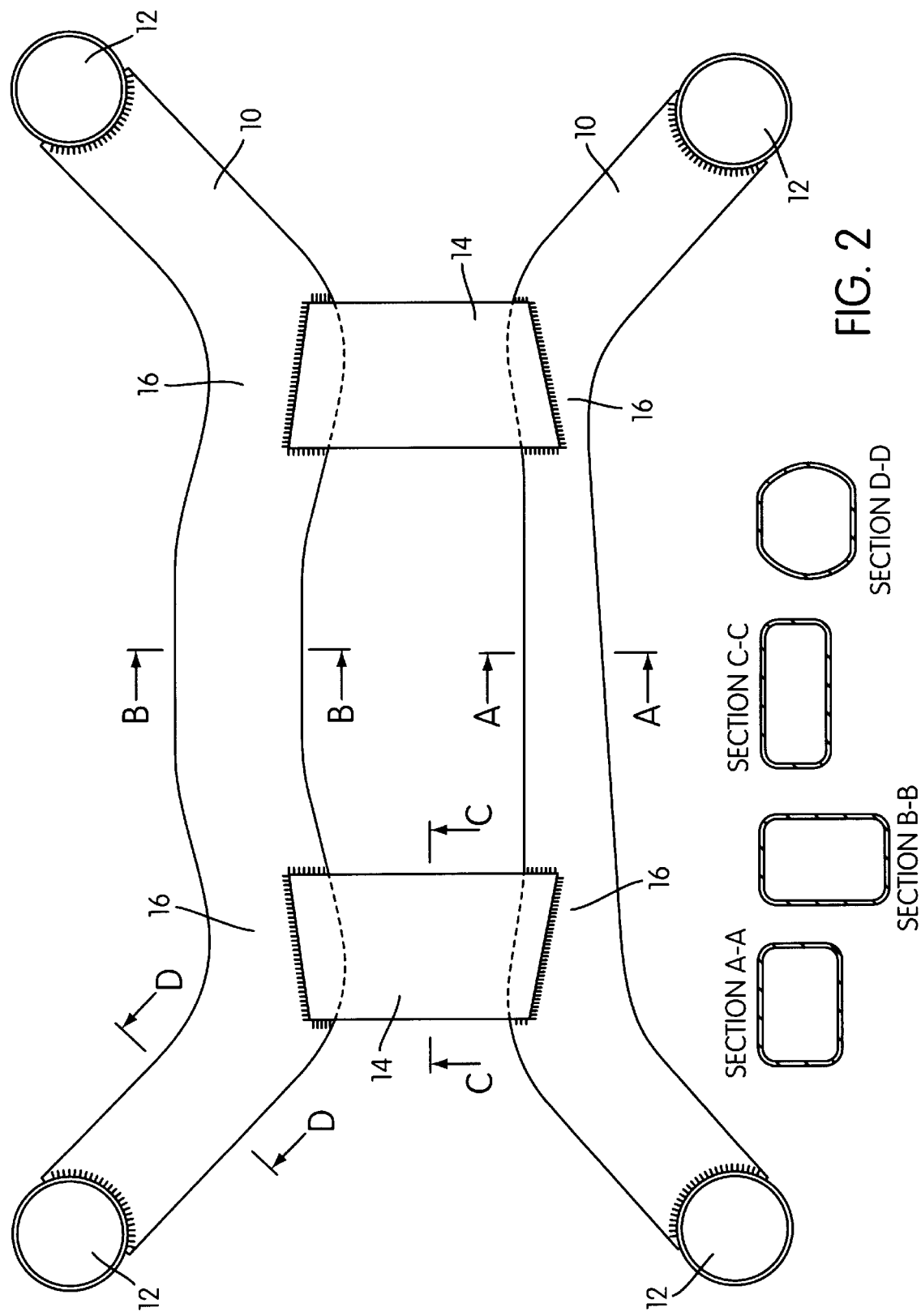
FIG. 2 shows a schematic view of another suspension arm in accordance with the invention that is comprised of 4 hollow parts.

FIG. 2 shows a section through another hollow suspension arm that is comprised of 4 IHP parts. In this embodiment two hollow parts that essentially are undulated are connected by means of hollow parts that follow the wave troughs (by means of the customary connection methods that are familiar to those skilled in the art and that are described above). Here, too, the hollow parts, as can be seen in the cross sections shown below in FIG. 2, have different cross sections across their longitudinal expansion.

Figure 3:
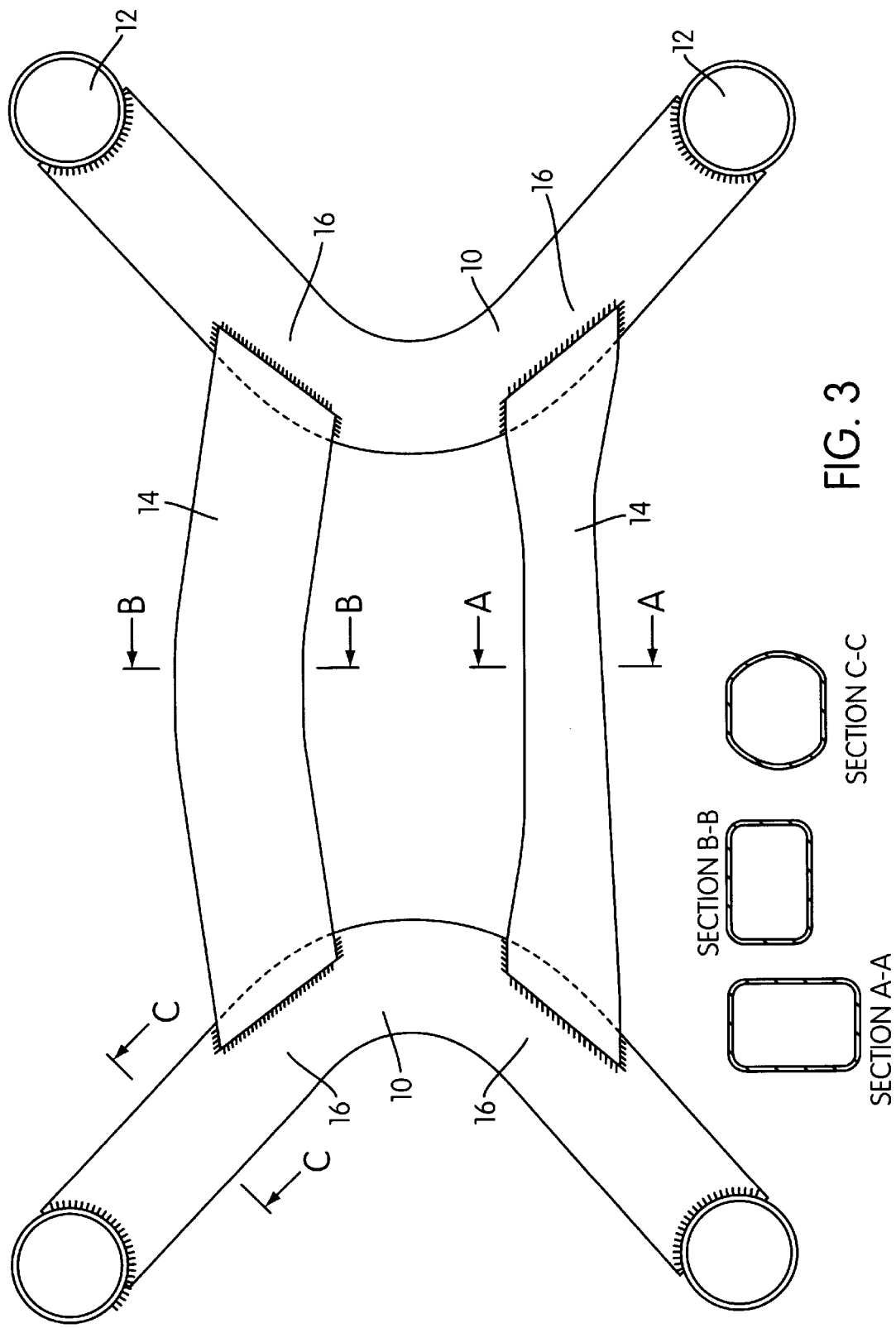
FIG. 3 shows a schematic view of yet another suspension arm in accordance with the invention that is comprised of 4 hollow parts.

FIG. 3 finally shows a suspension arm in which two mainly angular hollow longitudinal mounts are connected by means of two hollow connecting parts.

Depending on the intended use, those skilled in the art select the suitable embodiment that combines the optimum weight with optimum driving features.

In accordance with the IHP process it is possible to continue to treat the mount in the customary manner, e.g. through selective hardening. Customary processes such as fashioning the hollow parts by means of one or several secondary treatments is possible, with those treatments either being nitro-carburizing, plasma-nitrading, boronizing, laser hardening, hardening without carburizing, induction hardening, flame-hardening, electron-mount curing, case hardening whereby, for example, the connecting pieces, connecting openings and possibly subsequent form elements receive an improved degree of hardness or load capacity.

Although only three preferred embodiments are explained for a suspension arm in accordance with the invention, the invention is not restricted to those by any means, and modifications and changes within the scope of protection of the claims are familiar to those skilled in the art.

What is claimed is:

1. A suspension arm for fastening wheels to a vehicle having a longitudinal axis, said suspension arm comprising a supporting structure constructed and arranged to elastically absorb transverse and longitudinal forces transferred from the wheels to the supporting structure, said supporting structure comprising:

two hollow rear axle supports, each formed by a high interior pressure metal forming process, said hollow rear axle supports each having a variable cross-sectional shape and being connected to one another, said two hollow rear axle supports each extending generally in a direction transverse to said longitudinal axis and being undulated along their respective lengths to define two wave troughs, said two hollow rear axle supports being arranged in opposing relation to each other so that the respective wave troughs contact one another at two points and are welded to one another at said two points; and fastening devices attached at opposite ends of each of said two hollow rear axle supports adapted for fastening said support structure to a vehicle.

2. Suspension arm in accordance with claim 1 is characterized in that the hollow rear axle supports (10) are connected by means of at least two hollow connection parts (14).

3. Suspension arm in accordance with claim 1 is characterized in that the rear axle supports essentially are angular and are connected by means of two hollow connection parts (14) that essentially run transversely to the longitudinal axis of the vehicle.

4. Suspension arm in accordance with claim 1 is characterized in that the hollow parts (14, 10) at least partially, are made of a cold forming metal or metal alloy or plastic material and have a fiber orientation that is parallel to the exterior contours of the hollow parts (14, 10).

5. Suspension arm with hollow machined parts in accordance with claim 1 is characterized in that at least part of the material is carbon containing steel and/or at least partially an aluminum alloy.

6. Suspension arm in accordance with claim 5 is characterized in that the Al alloy is a self-hardening alloy or a precipitation hardening alloy.

7. Suspension arm in accordance with claim 1 is characterized in that at least a part of the material is a fiber reinforced material.

8. Suspension arm in accordance with claim 1 is characterized in that the hollow machined parts (10, 14) at least partially have molded profiles such as longitudinal and/or transverse ribs.

9. Suspension arm in accordance with claim 1, wherein the hollow rear axle supports are connected by means of at least two hollow connection parts.

* * * * *